United States Patent
Kastner et al.

(10) Patent No.: US 11,465,322 B2
(45) Date of Patent: Oct. 11, 2022

(54) METHOD OF DETERMINING A SOLUTION STATE OF A GAS

(71) Applicant: ENGEL AUSTRIA GmbH, Schwertberg (AT)

(72) Inventors: Clemens Kastner, Linz (AT); Ruth Markut-Kohl, Vienna (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 310 days.

(21) Appl. No.: 16/393,340

(22) Filed: Apr. 24, 2019

(65) Prior Publication Data

US 2019/0329470 A1 Oct. 31, 2019

(30) Foreign Application Priority Data

Apr. 25, 2018 (AT) .............................. A 50349/2018
Apr. 5, 2019 (DE) .......................... 102019108997.2

(51) Int. Cl.
*B29C 45/76* (2006.01)
*B29C 43/58* (2006.01)
(Continued)

(52) U.S. Cl.
CPC .............. *B29C 45/76* (2013.01); *B29C 43/58* (2013.01); *B29C 45/50* (2013.01); *B29C 45/54* (2013.01);
(Continued)

(58) Field of Classification Search
CPC .. B29C 2945/76006; B29C 2945/7618; B29C 2945/76301; B29C 2945/76361;
(Continued)

(56) References Cited

U.S. PATENT DOCUMENTS

| 4,816,197 A | 3/1989 | Nunn |
| 4,850,217 A | 7/1989 | Nunn |

(Continued)

FOREIGN PATENT DOCUMENTS

| AT | 517128 | 11/2016 |
| AT | 520733 | 7/2019 |

(Continued)

OTHER PUBLICATIONS

Clemens Kastner et al., "Development of measurement method for determination of dynamic solubility limits in injection foam molding", ResearchGate, Conference Paper in AIP Conference Proceedings, Feb. 2019.

(Continued)

*Primary Examiner* — Robert J Grun
(74) *Attorney, Agent, or Firm* — Wenderoth, Lind & Ponack, L.L.P.

(57) ABSTRACT

A method of determining a solution state of a gas in a plastic melt used in a plastic shaping method includes:
(vi) providing the plastic melt together with the gas in a chamber,
(vii) altering—in particular reducing—a volume of the chamber to alter a pressure of the plastic melt together with the gas—in particular increased from a first pressure value to a second pressure value,
(viii) introducing the plastic melt into a shaping cavity,
(ix) computing at least one compression parameter characteristic of the compression behaviour of the plastic melt, in particular a modulus of compression, from the first pressure value and the second pressure value, and
(x) determining from the at least one compression parameter whether the gas is substantially completely dissolved in the plastic melt and/or a solubility limit of the
(Continued)

gas in the plastic melt is determined from the at least one compression parameter.

30 Claims, 4 Drawing Sheets

(51) Int. Cl.
*B29C 45/50* (2006.01)
*B29C 45/54* (2006.01)

(52) U.S. Cl.
CPC .............. *B29C 2945/76003* (2013.01); *B29C 2945/76665* (2013.01)

(58) Field of Classification Search
CPC ........... B29C 2945/76665; B29C 2945/76839; B29C 43/58; B29C 45/50; B29C 45/54; B29C 45/76; B29C 2945/76003; B29C 2945/7601; B29C 2945/7605; B29C 2945/76053; B29C 2945/76083; B29C 2945/76107; B29C 2945/76187; B29C 2945/7619; B29C 2945/76287; B29C 2945/76852; B29C 45/7646; B29C 45/7693; B29C 2945/76297; B29C 2945/76374

See application file for complete search history.

(56) References Cited

U.S. PATENT DOCUMENTS

| | | | |
|---|---|---|---|
| 5,002,475 A | 3/1991 | Graefe | |
| 5,256,345 A | 10/1993 | Yokota | |
| 6,284,810 B1 | 9/2001 | Burnham et al. | |
| 6,562,276 B1 | 5/2003 | Shelby et al. | |
| 6,884,377 B1 | 4/2005 | Burnham et al. | |
| 8,980,147 B2 | 3/2015 | Yusa et al. | |
| 9,186,634 B2 | 11/2015 | Yusa et al. | |
| 9,718,217 B2 | 8/2017 | Yusa et al. | |
| 10,357,905 B2 | 7/2019 | Stigsson et al. | |
| 10,589,450 B2 | 3/2020 | Pillwein et al. | |
| 2001/0000930 A1 | 5/2001 | Kim | |
| 2002/0033132 A1 | 3/2002 | Kim | |
| 2003/0141625 A1 | 7/2003 | Shelby et al. | |
| 2005/0256215 A1 | 11/2005 | Burnham et al. | |
| 2013/0285273 A1 | 10/2013 | Yusa et al. | |
| 2014/0091489 A1 | 4/2014 | Kim et al. | |
| 2015/0103615 A1 | 4/2015 | Yusa et al. | |
| 2016/0039116 A1 | 2/2016 | Yusa et al. | |
| 2016/0311140 A1 | 10/2016 | Stigsson et al. | |
| 2016/0332342 A1 | 11/2016 | Pillwein et al. | |
| 2019/0329470 A1 | 10/2019 | Kastner et al. | |
| 2020/0156300 A1 | 5/2020 | Pillwein et al. | |
| 2020/0230851 A1 | 7/2020 | Dix et al. | |
| 2020/0254658 A1 | 8/2020 | Dix et al. | |
| 2020/0316838 A1* | 10/2020 | Kastner | B29C 45/77 |

FOREIGN PATENT DOCUMENTS

| | | |
|---|---|---|
| CN | 1055504 | 10/1991 |
| CN | 101028739 | 9/2007 |
| CN | 101486239 | 7/2009 |
| CN | 105829049 | 8/2016 |
| CN | 106313458 | 1/2017 |
| DE | 69733286 | 1/2006 |
| DE | 10 2007 030 637 | 1/2009 |
| JP | 2002-67116 | 3/2002 |
| JP | 2008-074114 | 4/2008 |
| JP | 2008-143111 | 6/2008 |
| JP | 2013-107402 | 6/2013 |

OTHER PUBLICATIONS

R. Endlweber et al., "The MuCell—foam injection molding: small cells, big impact", Plastics 103 (2013) 11, pp. 36-40, with English language abstract.

\* cited by examiner

METHOD OF DETERMINING A SOLUTION STATE OF A GAS

BACKGROUND OF THE INVENTION

The present invention concerns a method of determining a solution state of a gas in a plastic melt used in a plastic shaping method, and a computer program product for determining a solution state of a gas in a plastic melt in a plastic shaping method.

It is known to use an injection unit of an injection moulding machine to carry out compression tests on the plastic melt used. In that respect attention can be directed to AT 517 128 A1.

DE 10 2007 030 637 A1 also discloses a special application in which a quantitative ratio is inferred from a powder component and a binder component of an injection-mouldable material by ascertaining a modulus of compression.

Injection moulding methods are also known, in which a gas is added to the plastic melt used. That can be effected for example during plasticisation of the plastic in a plasticising cylinder by a gas injector.

In that respect, it is important that the gas added to the plastic melt is substantially completely dissolved. Otherwise small gas bubbles in the plastic melt can give rise to bubble flaws, gas cushions or streaks in the (hardened) component produced by the plastic shaping method. Further consequences can be severe distortion, that is to say serious deviations from the desired component geometry, as far as explosive bursting of the gas cushions involved. The result of those negative consequences is that the corresponding components are unusable and are to be declared as rejects.

SUMMARY OF THE INVENTION

Therefore the object of the invention is to provide a method and a computer program product for the injection moulding of gas-loaded plastic melts with reduced wastage or fewer negative component traits to be attributed to undissolved gas.

In the context of the plastic shaping method, the object is effected in that, in the course of a method step, it is determined from the at least one compression parameter whether the gas is substantially completely dissolved in the plastic melt and/or a solubility limit of the gas in the plastic melt is determined from the at least one compression parameter.

In regard to the computer program product, the object is attained insofar as there are provided commands which cause a computer when executing the program to carry out the following steps:

outputting at least one first actuation signal to a shaping machine for providing the plastic melt together with the gas in a chamber, outputting at least one second actuation signal to the shaping machine for altering—in particular reducing—a volume of the chamber, whereby a pressure of the plastic melt together with the gas is altered, in particular increased, from a first pressure value to a second pressure value, outputting at least one third actuation signal to the shaping machine for introducing the plastic melt into a shaping cavity, computing at least one compression parameter characteristic of the compression behaviour of the plastic melt, in particular a modulus of compression, from the first pressure value and the second pressure value, and determining from the at least one compression parameter whether the gas is substantially completely dissolved in the plastic melt and/or determining a solubility limit of the gas in the plastic melt from the at least one compression parameter.

It is of particular advantage in relation to the invention that the operation of determining whether the gas is substantially completely dissolved in the plastic melt and/or determining the solubility limit can be carried out directly at the shaping machine (and thus relatively quickly) without significantly disturbing the plastic shaping process. That eliminates problems which would occur by virtue of the transmission of measurement results from other tests to the shaping machine.

It is to be noted that introduction of the gas into the chamber or the plastic melt can take place during the plasticising operation. Introduction of the gas into the plastic melt can be carried out by injection, in particular by means of a gas injector.

In the context of method step (ii), the volume of the chamber can be reduced or increased. In the preferred former case the pressure in the plastic melt together with the gas is increased from the first pressure value to the second pressure value, but otherwise reduced.

In the course of method step (iv), the modulus of compression can be calculated. Alternative compression parameters—that is to say parameters which describe the compression behaviour of the plastic melt—would be for example compressibility or a (pressure-dependent) specific density.

Method steps (iv) and (v) can be carried out during or after the plastic shaping process.

Method steps (i) to (iv) can be denoted together as a compression test.

The solution state, that is to say the question whether or to what degree the gas is completely dissolved in the plastic melt, with the known relationship between the at least one compression parameter and the solution state, can be determined from the at least one compression parameter. In accordance with the invention, the operation of determining the solution state is deemed to be the operation of determining whether the gas is substantially completely dissolved in the plastic melt.

The solubility limit can be determined as a value or in the form of a lower or upper limit, that is to say in the form of a statement that the solubility limit for the process parameters being considered is above or below a certain value.

The expression solubility limit is used to denote an amount of gas, above which complete dissolution of the gas in the plastic melt no longer applies. The solubility limit can depend on further parameters like the materials used and the temperature. It can be formulated as an intensive or extensive quantity.

For calculating the compression parameter, in particular the modulus of compression, besides the first pressure value and the second pressure value data in relation to the initial volume and the change in volume are usually also used, in which respect that can take place in different ways.

A shaping machine can also be used in a method according to the invention. The term 'shaping machine' can be used in that respect to denote injection moulding machines, injection presses, presses and the like.

The provision of the plastic melt together with the gas can be carried out by producing the plastic melt—preferably using an injection unit—and then introducing the gas. As an alternative to the use of an injection unit, it is also possible to use a plastic melt stored in an intermediate storage element (referred to as: "shot pot").

An injection unit with a plasticising screw can be arranged in a plasticising cylinder, and the plasticising screw can be rotatably moved for the plasticising operation and is axially moved for the injection operation. It will be appreciated that an axial movement of the plasticising screw can also occur in the plasticising operation by the accumulation of plastic melt in the screw pre-chamber. A rotary movement during injection is also possible. In most cases injection moulding machines have injection units with a plasticising cylinder and a plasticising screw so that no major structural changes have to be implemented in this advantageous embodiment in order to carry out the method according to the invention.

Similar advantages in regard to simple implementation of the method according to the invention can also be achieved by the use of a screw pre-chamber in a plasticising cylinder as the chamber.

In preferred embodiments, it can also be conducive for simple method implementation if the chamber is delimited at the shaping cavity side by a shut-off device, preferably in the form of a needle closure nozzle and/or that the chamber at its side remote from the shaping cavity is delimited by a plasticising screw or an injection piston.

Alternatively, it is possible to use a separate chamber which is delimited for example by one or more shut-off devices.

The reduction in the volume of the chamber in accordance with method step (ii) can be carried out as part of an introduction operation in accordance with method step (iii). For example, an advance movement of a plasticising screw for injection in an injection moulding process can be used for reducing the volume of the chamber in accordance with method step (ii). That gives a time savings because method step (ii) does not have to be carried out separately.

The volume of the plastic melt together with the gas can be so greatly reduced in accordance with method step (ii) that the second pressure value is above those pressures which otherwise occur in the plastic melt together with the gas during the injection process. In that way, it is possible to ensure that, during the entire plastic shaping process (the greatest pressures usually occur in the injection phase) the gas is substantially completely dissolved or the solubility limit determined in accordance with the invention applies throughout the entire plastic shaping process.

In the case of an increase in the volume of the chamber in the course of method step (ii), alternatively the first pressure value can be above those pressures which otherwise occur in the plastic melt together with the gas during the injection process, in order to achieve that effect.

The operation of determining the first pressure value and the second pressure value can advantageously be carried out by means of a pressure sensor at the chamber, which represents an embodiment having a high level of measurement accuracy. It is however also possible for the first pressure value and the second pressure value to be detected indirectly, for example by way of a hydraulic pressure in a hydraulic cylinder used for introducing the plastic melt or a torque of an electric drive used for introducing the plastic melt. During injection of the plastic melt the force detected in that way or the pressure detected in that way is referred to as the injection force or the injection pressure respectively.

In a particularly simple configuration, a step of determining a change in volume of the chamber can be carried out by a step of determining a plasticising screw travel.

Further, the reduction in the volume of the chamber in accordance with method step (ii) can be carried out in pressure-regulated mode, wherein in particular a pressure-regulated axial movement of a plasticising screw and/or an injection piston is used. The pressure-regulated reduction in the volume of the chamber can provide that sufficiently high pressures are involved in order to be able to determine substantially complete dissolution of the gas in the plastic melt or the solubility limit in reliable fashion—in particular over the entire plastic shaping process. At the same time, given maximum pressures (for example of a needle closure nozzle) can be easily maintained by pressure regulation.

For example, closed-loop control in accordance with position or open-loop control can, however, also be provided for carrying out method step (ii).

The informative value of the determined, substantially complete solution of the gas in the plastic melt or the solubility limit can also be conducive if a temperature of the plastic melt is open-loop or closed-loop controlled, wherein a target temperature for open-loop or closed-loop control is kept substantially constant during execution of method step (ii), as the solubility limit can involve a temperature dependency.

In the course of method step (ii), the plastic melt can be kept at the second pressure value until substantially an equilibrium state occurs. That can also be conducive for the reliability of the ascertained, substantially complete dissolution of the gas in the plastic melt or the solubility limit.

The gas used can be an inert gas, wherein preferably molecular nitrogen or carbon dioxide can be used.

The operation of determining the compression parameter, in particular the modulus of compression, can be effected in an automated procedure. In particular, for example after the start of a program for detecting the modulus of compression a delay in opening of the closure nozzle can be activated. Then, for example, a change in volume $\Delta V$ and a change in pressure $\Delta p$ can be automatically ascertained by the shaping machine by way of the machine-internal process data acquisition system. Thereafter, for example, the modulus of compression K can be automatically determined after each shot by way of the equation $K = V_0 \, \Delta p / \Delta V$ (with $V_0$ the volume prior to compression), stored and output.

Method steps (i) to (v) can be carried out a plurality of times, wherein preferably different amounts of the gas are introduced into the plastic melt and compression parameters are calculated for the different amounts of the injected gas. In that way, not only is it possible to detect a degree of dissolution of a specifically involved plastic melt, but a general relationship as to how the degree of gas solution behaves with different amounts of the injected gas. That can evidently afford advantages if an intentional or unintentional change in the process parameters of the plastic shaping process occurs or is planned. In particular it is possible in that way to take the amount of gas introduced to the solubility limit, that is to say maximise it.

A possible procedure for determining the solubility limit can preferably provide that the compression parameters determined for different amounts of injected gas are fitted in the course of a curve fit to a parametrised curve generally describing the relationship between the injected amount of gas and the compression parameter and the solubility limit is determined as or from at least one fit parameter generated in that curve fit.

In particular, the parameterized curve can be given by the following equation:

$$K = \frac{K_0 - kc + P_u d^{\frac{c}{e}}}{(1 + |\lambda c|^a)^{\frac{1-n}{a}}}$$

wherein $K_0$ denotes the modulus of compression of the plastic melt without gas loading, k the initial increase below the solubility limit, c the gas concentration, $P_u$ the unit pressure, d, n, a and e scaling factors as well as λ the inverse solubility limit. The gas concentration c can be determined by way of the known amounts of the plastic melt and the gas introduced.

A maximum amount of gas to be fed can then be determined as:

$$S = \frac{1}{\lambda}$$

In the context of an alternative for determining the solubility limit starting from a compression parameter which corresponds to a smallest amount of injected gas a linear relationship can be determined between a partial amount of the compression parameter which is determined and that the solubility limit can be determined as the smallest of those amount of the injected gas, in respect of which a deviation from the linear relationship of more than a previously established limit value occurs.

The two described possible ways of determining the solubility limit provide firstly a possible way of establishing a value of the solubility limit reproducibly, that is to say independently of a human observer. Secondly, there is then also no need for a previously known relationship between the at least one compression parameter and the degree of dissolution.

By determining the compression parameter a plurality of times with different amounts of gas introduced into the plastic melt by a first procedure, it is also possible to compare further procedures for introducing the gas into the plastic melt to the first procedure (and with each other). For, in practice, absolute amounts of the gas introduced into the plastic melts when using different procedures are often not comparable (by virtue of systemic deviations). For that purpose, it is possible to use method steps (i) to (iv) for determining the compression parameter with the second procedure for introducing the gas into the plastic melt and amounts of gas introduced into the plastic melts by the first procedure and the second procedure can be compared on the basis of the determined compression parameter. It will be appreciated that compression parameters or solubility limits can also be determined both with the first and also with the second procedure for a plurality of introduced amounts of gas and used for scaling the amounts of gas introduced.

That can be particularly simple to implement if the operation of determining the solubility limit is effected by means of a curve fit, in particular using the K-equation because then the solubility limit is relatively easily available as a parameter value.

In particular physical foaming methods can be compared. The applicability to chemical foaming technologies is also thought to be a given.

Some examples of physical technologies (commercial brand names in brackets): direct gassing processes (Mu-Cell), solids gassing in a separate autoclave (Protec), solids gassing in a pressure chamber lock by way of a hopper (Profoam).

In a particularly preferred embodiment of the invention, the operation of determining the solubility limit of the gas—and preferably therefrom a target amount for the injection of the gas into the plastic melt—can be carried out automatically by a machine control of the shaping machine. In that respect, in particular recourse can be had to be above-described methods of reproducibly determining the solubility limit. It is to be noted that the machine control can be arranged centrally on the shaping machine or can be arranged remotely from the shaping machine and can be linked with a remote data transmission connection (for example a cloud server). Distributed implementation of the machine control with certain components and functionalities at the shaping machine itself and certain other components and functionalities arranged remotely therefrom is also possible.

The solubility limit can be determined in dependence on a process parameter—in particular a temperature or the pressure of the plastic melt—. Preferably it can be provided in that respect that the process parameter is optimised, utilising the solubility limit. That optimisation can preferably be effected in an automated procedure, in particular in fully automated or partially automated fashion, for example in the form of a prompt for an operator.

This means for example the—in particular automated—detection of the solubility limit affords the option of minimising the pressure in the cylinder during the metering phase (dynamic pressure or pressure in the plastic melt in the environment of the gas injector). For that purpose firstly the solubility limits at different pressures are determined. Those limits can then be plotted against the pressure. On the basis of that curve as a further consequence with a given amount of gas it is possible to set the lowest necessary pressure (and thus the most energy-saving pressure).

It is also possible to proceed in similar fashion for the temperature of the plastic melt. It is known that the solubility limit of for example nitrogen also rises with higher temperature. This means that, at a certain required gas content, the temperature can possibly be reduced. Determining the value by which the temperature can be reduced can be effected in fully automatic fashion for example for automatically ascertaining the solubility limit. Actual adaptation of the temperature could then be fully automatically implemented by the machine control.

Automation of the detection of the solubility limit for the first time affords the option of providing that the amount of gas which can be dissolved at a maximum in the plastic melt, at a given pressure, can be ascertained in fully automated fashion. In addition that determining operation can take place at different pressures and temperatures in order to characterise a material in respect of gas solubility. Starting from those ascertained maxima it is then possible for example to automatically set a certain percentage component.

By virtue of implementation of the points described here many decisions can be taken away from the operator and production can be markedly simplified and made more economical. In addition manual execution can be taken away from the operator by virtue of the automisation aspect.

The term injection of gas and introduction of gas are used to mean the same thing, that is to say those terms are used interchangeably.

BRIEF DESCRIPTION OF THE DRAWINGS

Further advantages and details of the invention will be apparent from the Figures and the related specific description. In the Figures.

DETAILED DESCRIPTION OF THE INVENTION

Figure 1:
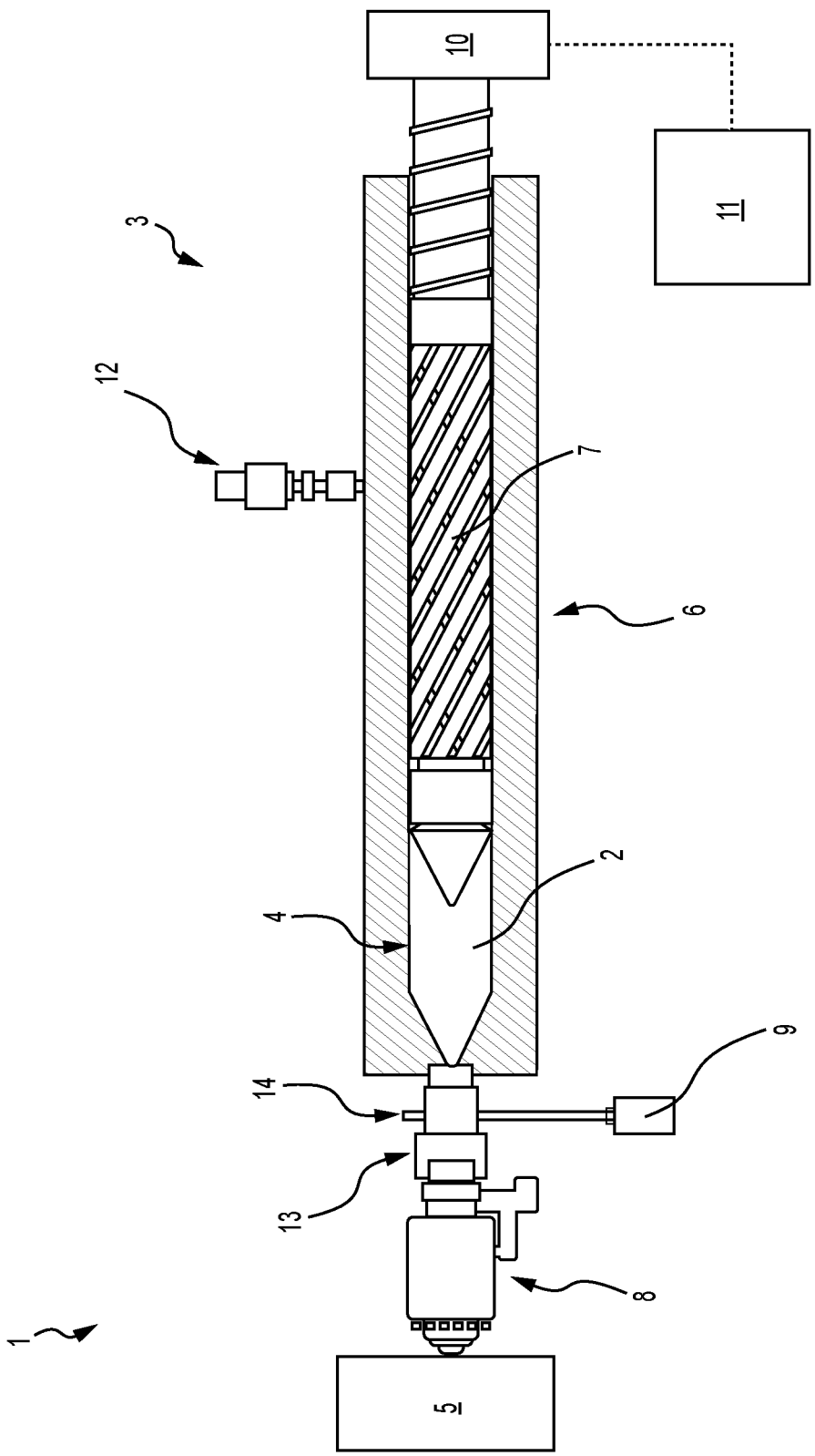
FIG. 1 shows an embodiment of an injection moulding machine for carrying out a method according to the invention.

FIG. 1 shows a shaping machine 1—in this case an injection moulding machine. It has an injection unit 3 for producing a plastic melt 2 by plasticisation of a plastic (generally in the form of granular material).

For that plasticisation operation a plasticising screw 7 is arranged in a plasticising cylinder 6. The plastic is fused by rotation of the plasticising screw 7 (shearing heat) and heating of the plasticising cylinder 6, and it is then in the form of a plastic melt 2 in the screw pre-chamber in the plasticising cylinder 6. That operation of producing the plastic melt is also referred to as "metering".

The plasticising screw 7 can also be moved axially. In particular the plastic melt 2 can be injected into the purely diagrammatically illustrated shaping cavity 5 by an advance movement of the plasticising screw 7.

The drive 10 for the rotating and axial movement of the plasticising screw 7 and a machine control 11 are also only diagrammatically shown.

A gas injector 12 is provided for introducing the gas into the plastic melt.

In this embodiment the gas injector 12 is arranged in overlapping relationship with a mixing portion of the plasticising screw 7.

Arranged between the plasticising cylinder 6 and the shaping cavity 5 are a measurement flange 13 and a shut-off device 8 which for example can be in the form of a needle closure nozzle.

The measurement flange 13 serves for the connection of a pressure sensor 9 for detecting the pressure in the plastic melt 2. The pressure sensor 9 however could also be arranged elsewhere, for example directly in the plasticising cylinder 6. Finally the pressure of the plastic melt 2 can also be measured indirectly, for example as a hydraulic pressure in a hydraulic cylinder driving the screw advance movement (as part of the drive 10) or as torque of an electric machine driving the screw advance movement (being part of the drive 10). The measurement flange 13 is therefore to be considered as optional for the structure shown in FIG. 1.

The shut-off device 8 serves for shutting off the flow of plastic melt 2 into the shaping cavity 5. In that way the screw pre-chamber can form the chamber 4 in which the plastic melt 2 can be enclosed. The volume of the chamber 4 formed in that way can be altered by axial movement of the plasticising screw 6.

The ultrasound sensor 14 is also purely optional, which by detection of any bubble formation in the plastic melt 2 can serve to verify the information acquired according to the invention about the solution state of the gas in the plastic melt 2.

The execution of a method according to the invention using the injection moulding machine shown in FIG. 1 will now be described.

After the metering operation the gas-loaded plastic melt is under a dynamic pressure (first pressure value) in the chamber 4. Thereupon the injection operation is initiated by the advance movement of the plasticising screw 7 wherein the shut-off device 8 firstly still remains closed. The screw advance movement is continued in pressure-regulated fashion until a predetermined increased dynamic pressure (second pressure value) is reached. The change in volume in the course of method step (ii) can be detected by detection of the travel covered by the plasticising screw 7 from a value which corresponds to the volume of the chamber 4 prior to the reduction thereof to a further value which corresponds to the volume of the chamber 4 after the reduction. The predetermined dynamic pressure (second pressure value) can in that case be held over a period of time in order to ensure that an equilibrium state has occurred.

The shut-off device 8 can then be opened and the process of injecting the plastic melt into the shaping cavity 5 can be continued. Naturally it is possible—but not obligatory—for the dynamic pressure to be reduced by moving the plasticising screw 7 back prior to opening the shut-off device 8.

Independently of the further plastic shaping process it is possible from the detected screw travel against the known diameter of the plasticising cylinder 6 to calculate the change in volume $\Delta V$ of the chamber 4 and from the first pressure value and the second pressure value which were detected it is possible to calculate the change in pressure $\Delta p$. In a similar manner a starting volume $V_0$ of the chamber 4 can be determined prior to beginning the reduction in the volume of the chamber 4. From those data it is possible to calculate the modulus of compression K, defined as $$K = -V_0 \frac{\Delta p}{\Delta V}.$$

With the known relationship between the modulus of compression K and the solution state of the gas used in the plastic melt 2, by virtue of the calculated modulus of compression K it is possible to infer whether the gas is substantially completely dissolved in the plastic melt or—expressed in other terms—there is an upper or lower limit for the solubility limit. In that way it is also possible to carry out automatic monitoring of the plastic shaping method in regard to solution of the gas in the plastic melt 2.

If there is no such relationship then the above-described method can be carried out a plurality of time with injection of different amounts of the gas into the plastic melt. For that purpose attention is directed to FIG. 3 and the specific description relating thereto.

Figure 2:
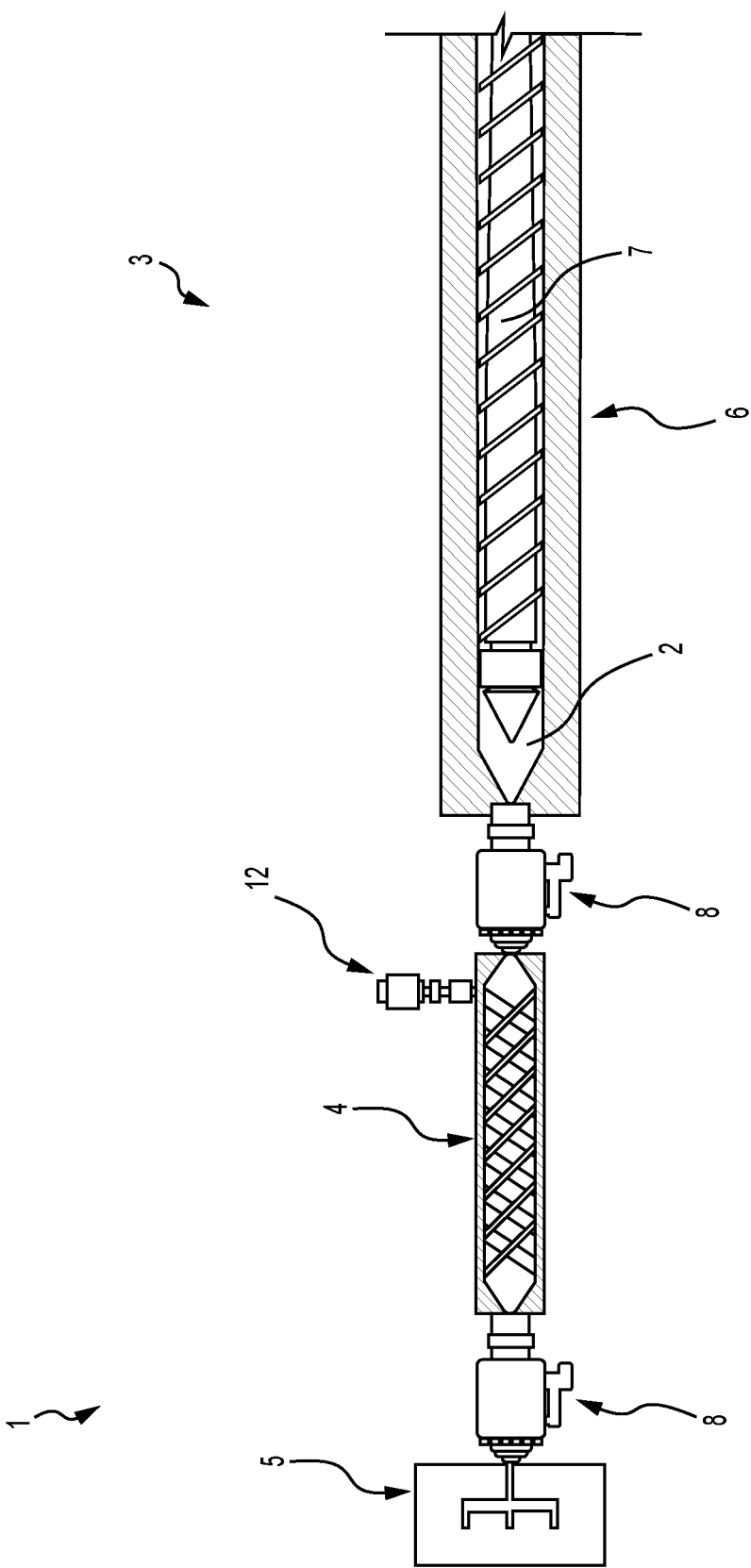
FIG. 2 shows a further embodiment of an injection moulding machine for carrying out a method according to the invention.

FIG. 2 shows an alternative embodiment for the chamber 4. In this case there is a separate component (which can preferably be in the form of a mixing device). A static mixing element is additionally provided in that separate component.

In this embodiment the gas injector 12 injects the gas directly into the chamber 4 of the separate component.

For carrying out the method according to the invention a shut-off device 8 near the shaping cavity can be closed. During compression of the plastic melt 2, that is to say during the reduction in the volume of the chamber 4, that shut-off device 8 disposed between the separate component and the plasticising cylinder 6 remains open. The plasticising screw 7 then compresses the plastic melt 2 in the above-described fashion. Then therefore the screw prechamber is also part of the chamber 4.

A pressure sensor 9 is not illustrated in the structure shown in FIG. 2, but can naturally be provided in the described forms or on the separate component, or the pressure in the plastic melt 2 can be measured indirectly.

Figure 3:
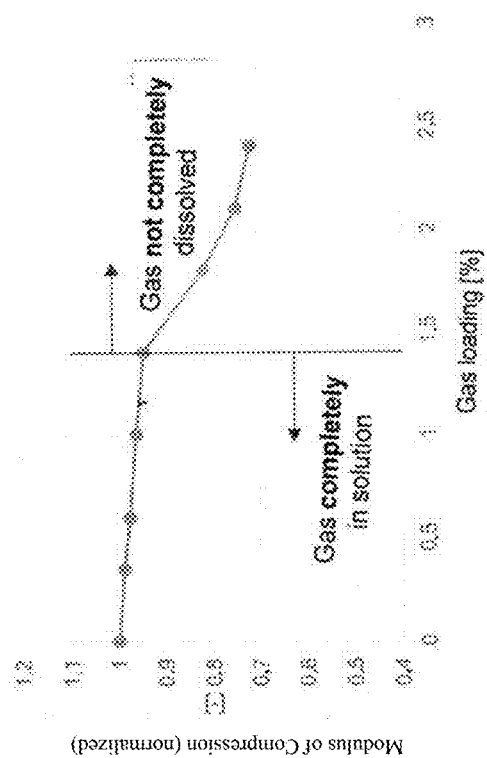
FIG. 3 shows a diagram to illustrate the relationship between the modulus of compression and the gas loading of a plastic melt.

FIG. 3 shows an actually measured relationship between the amount of gas introduced into the plastic melt 2 (gas loading or gas content) and the modulus of compression K, wherein the values of the modulus of compression were ascertained by carrying out a method according to the invention. In this case the modulus of compression K at a gas loading 0 is standardised to 1. The gas loading is specified relative to the amount of the plastic melt.

The dependency which can be seen in respect of the modulus of compression K on the gas loading represents a characteristic configuration, as occurs in particular when other process parameters (temperature, dynamic pressure and so forth) are kept constant.

The solubility limit is clearly marked by a vertical line. With lower levels of gas loading there is a linear relationship between gas loading and modulus of compression K. Above the solubility limit there is a relatively sharp drop in the modulus of compression K which is in fact caused by the higher compressibility of the small bubbles which form due to incomplete solution of the gas in the plastic melt 2.

If the relationship shown in FIG. 3 is known the plastic shaping method can be monitored in regard to gas solution by reviewing the modulus of compression K.

If the relationship is not known it can be afforded by carrying out the method according to the invention a plurality of times. That affords the possibility of optimisation (real) of the plastic shaping method in respect of the amount of gas.

In addition the solubility limit can be automatically determined by for example determining (fitting) the linear relationship for the lower gas loading value and by ascertaining where a deviation goes beyond a certain previously established limit value.

That criterion can also be used in order to abort in automated fashion a measurement series for determining the solubility limit.

That finally also permits automatic adjustment (in particular optimisation) of the plastic shaping method, for example by the machine control 11 establishing a target value for the amount of gas loading automatically at or in the proximity of the solubility limits—preferably beneath it by a predetermined value.

For that purpose and generally for carrying out the method according to the invention the machine control 11 can be supplied with signals from the pressure sensor 9—insofar as that is used separately.

Figure 4:
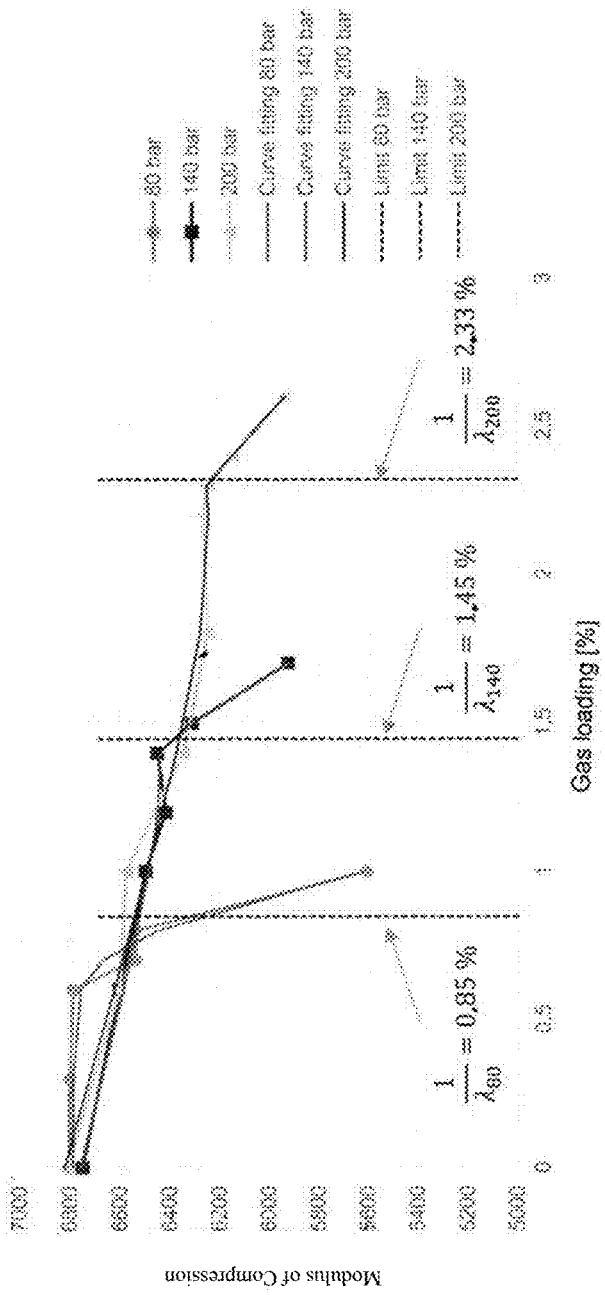
FIG. 4 shows a diagram to illustrate a curve fit for determining the solubility limit.

FIG. 4 shows a chart which is similar to FIG. 3, wherein a respective modulus of compression was determined for three different first pressures (80 bars, 140 bars and 200 bars) for different gas loadings (amounts of introduced gas).

The illustrated data points can also be in the form of mean values of determined values for the compression parameter in the case of a plurality of compression tests carried out under identical conditions (equal settings).

The Figure also illustrates a respective curve fit for the three measurement series, in the course of which the parameters of the following equation were ascertained (K-equation):

$$K = \frac{K_0 - kc + P_u d e^{\frac{c}{e}}}{(1 + |\lambda c|^a)^{\frac{1-n}{a}}}$$

In that respect the following parameters are used:
$K_0$ modulus of compression of the plastic melt without gas loading [bar]
k initial increase below the solubility limit [bar/%]
c gas concentration [%]
$P_u$ unit pressure [1 bar]
d, n, a dimension-less scaling factors [–]
e scaling factor [%]
$\lambda$ inverse solubility limit [1/%]

The following table lists the values of the fit parameters ascertained in the course of the curve fit together with their units:

| Parameter | Unit | By fitting ascertained values |
|---|---|---|
| $K_0$ | bar | 6786.77 |
| k | bar/% | 0.21 |
| d | — | 0.0161 |
| n | — | 0.00 |
| a | — | 9.11 |
| $\lambda_{80}$ | 1/% | 1.18 |
| f | % | 0.0325 |
| $K_0$ | bar | 6757.06 |
| k | bar/% | 300.29 |
| d | — | 1.8666 |
| n | — | 0.40 |
| a | — | 152.63 |
| $\lambda_{140}$ | 1/% | 0.69 |
| f | % | 0.1894 |
| $K_0$ | bar | 6820.27 |
| k | bar/% | 337.04 |
| d | — | 1.1462 |
| n | — | 0.39 |
| a | — | 350.00 |
| $\lambda_{200}$ | 1/% | 0.43 |
| f | % | 0.0588 |

As already mentioned detected values for introduced amounts of gas are often not comparable between different procedures for introducing the gas. The present invention makes it possible to compare those amounts of gas by determining the characteristic compression parameter—in particular the modulus of compression—in the further gas loading processes which are to be called upon for the comparison.

LIST OF REFERENCES 1 shaping machine
2 plastic melt
3 injection unit
4 chamber
5 shaping cavity
6 plasticising cylinder
7 plasticising screw
8 shut-off device
9 pressure sensor
10 drive
11 machine control
12 gas injector 13 measurement flange
14 ultrasonic sensor

The invention claimed is:
1. A method of determining a solution state of a gas in a plastic melt used in a plastic shaping method, wherein following method steps (i) to (iv) are carried out:
 (i) the plastic melt is provided together with the gas in a chamber,
 (ii) by altering a volume of the chamber a pressure of the plastic melt together with the gas is altered from a first pressure value to a second pressure value,
 (iii) the plastic melt is introduced into a shaping cavity,
 (iv) at least one compression parameter characteristic of the compression behaviour of the plastic melt is computed from the first pressure value and the second pressure value,
 wherein in addition
 (v) from the at least one compression parameter it is determined whether the gas is substantially completely dissolved in the plastic melt and/or a solubility limit of the gas in the plastic melt is determined from the at least one compression parameter.

2. The method according to claim 1, wherein the provision of the plastic melt together with the gas is carried out by producing the plastic melt and then introducing the gas.

3. The method according to claim 2, wherein an injection unit with a plasticising screw arranged in a plasticising cylinder is used, wherein the plasticising screw is rotatably moved for the plasticising operation and is axially moved for the injection operation.

4. The method according to claim 2, wherein the provision of the plastic melt together with the gas is carried out by producing the plastic melt using an injection unit.

5. The method according to claim 1, wherein the reduction in the volume of the chamber in accordance with method step (ii) is carried out as part of an introduction operation in accordance with method step (iii).

6. The method according to claim 1, wherein the volume of the plastic melt together with the gas is so greatly reduced in accordance with method step (ii) that the second pressure value is above those pressures which otherwise occur during the injection method in the plastic melt together with the gas, or that the first pressure value is above those pressures which otherwise occur during the injection method in the plastic melt together with the gas.

7. The method according to claim 1, wherein the chamber is delimited at the shaping cavity side by a shut-off device.

8. The method according to claim 7, wherein the shut-off device is in the form of a needle closure nozzle and/or that the chamber at its side remote from the shaping cavity is delimited by a plasticising screw or an injection piston.

9. The method according to claim 1, wherein a screw pre-chamber in a plasticising cylinder is used as the chamber.

10. The method according to claim 1, wherein a step for determining the first pressure value and the second pressure value is carried out by means of a pressure sensor at the chamber and/or the step of determining the first pressure value and the second pressure value is carried out indirectly.

11. The method according to claim 1, wherein a step of determining a change in volume ($\Delta V$) of the chamber is carried out by means of a step of determining a plasticising screw travel.

12. The method according to claim 1, wherein the reduction in the volume of the chamber in accordance with method step (ii) is carried out in pressure-regulated mode.

13. The method according to claim 12, wherein a pressure-regulated axial movement of a plasticising screw and/or an injection piston is used.

14. The method according to claim 1, wherein a temperature of the plastic melt is open-loop or closed-loop controlled, wherein a target temperature for open-loop or closed-loop control is kept substantially constant during execution of method step (ii).

15. The method according to claim 1, wherein, in the course of method step (ii), the plastic melt is kept at the second pressure value until substantially an equilibrium state occurs.

16. The method according to claim 1, wherein the gas used is an inert gas.

17. The method according to claim 16, wherein molecular nitrogen or carbon dioxide is used.

18. The method according to claim 1, wherein method steps (i) to (v) are carried out a plurality of times.

19. The method according to claim 18, wherein the compression parameters determined for different amounts of injected gas are fitted in the course of a curve fit to a parametrised curve generally describing the relationship between the injected amount of gas and the compression parameter and that the solubility limit is determined as or from at least one fit parameter generated in that curve fit.

20. The method according to claim 19, wherein the parameterised curve is given by the following equation:

$$K = \frac{K_0 - kc + P_u d^{\frac{c}{e}}}{(1 + |\lambda c|^a)^{\frac{1-n}{a}}}$$

wherein $K_0$ denotes the modulus of compression of the plastic melt without gas loading, k the initial increase below the solubility limit, c the gas concentration, $P_u$ the unit pressure, d, n, a and e scaling factors as well as $\lambda$ the inverse solubility limit.

21. The method according to claim 18, wherein starting from a compression parameter which corresponds to a smallest amount of injected gas a linear relationship is determined between a partial amount of the compression parameter which is determined and that the solubility limit is determined as the smallest of those amount of the injected gas, in respect of which a deviation from the linear relationship of more than a previously established limit value occurs.

22. The method according to claim 18, further comprising a first procedure for introducing the gas into the plastic melt, that method steps (i) to (iv) for determining the compression parameter are carried out with a second procedure for introducing the gas into the plastic melt, and that amounts of introduced gas into the plastic melt are compared by means of the first procedure and the second procedure on the basis of the determined compression parameters.

23. The method according to claim 18, wherein different amounts of the gas are introduced into the plastic melt and compression parameters are calculated for the different amounts of the injected gas.

24. The method according to claim 1, wherein the operation of determining the solubility limit of the gas is carried out automatically by a machine control of the shaping machine.

25. The method according to claim 24, wherein the operation of determining the solubility limit of the gas, and therefrom a target amount for the injection of the gas into the plastic melt, is carried out automatically by a machine control of the shaping machine.

26. The method according to claim 1, wherein the solubility limit is determined in dependence on a process parameter.

27. The method according to claim 26, wherein the process parameter is a temperature and/or the pressure of the plastic melt and the process parameter is optimised utilising the solubility limit.

28. A use of a shaping machine in the method according to claim 1.

29. The method according to claim 1, wherein the altering in method step (ii) is reducing the volume of the chamber which results in the pressure of the plastic melt together with the gas being increased from a first pressure value to a second pressure value, and the at least one compression parameter characteristic of the compression behaviour of the plastic melt in method step (iv) is a modulus of compression.

30. A non-transitory computer-readable storage medium storing a program for determining a solution state of a gas in a plastic melt used in a plastic shaping method comprising commands which cause a computer when executing the program to carry out the following steps:

outputting at least one first actuation signal to a shaping machine for providing the plastic melt together with the gas in a chamber, outputting at least one second actuation signal to the shaping machine for altering a volume of the chamber, whereby a pressure of the plastic melt together with the gas is altered from a first pressure value to a second pressure value, outputting at least one third actuation signal to the shaping machine for introducing the plastic melt into a shaping cavity, computing at least one compression parameter characteristic of the compression behaviour of the plastic melt from the first pressure value and the second pressure value, and determining from the at least one compression parameter whether the gas is substantially completely dissolved in the plastic melt and/or determining a solubility limit of the gas in the plastic melt from the at least one compression parameter.

* * * * *